United States Patent [19]
Solomon et al.

[11] Patent Number: 5,900,633
[45] Date of Patent: May 4, 1999

[54] SPECTROMETRIC METHOD FOR ANALYSIS OF FILM THICKNESS AND COMPOSITION ON A PATTERNED SAMPLE

[75] Inventors: Peter R. Solomon, West Hartford; Peter A. Rosenthal, West Simsbury, both of Conn.

[73] Assignee: On-Line Technologies, Inc

[21] Appl. No.: 08/990,834

[22] Filed: Dec. 15, 1997

[51] Int. Cl.$^6$ ............................. G01B 11/06; G01N 21/35

[52] U.S. Cl. ................. 250/339.08; 250/339.11; 250/559.27; 356/73; 356/381; 356/382

[58] Field of Search ................................. 356/381, 382; 250/339.07, 339.08, 339.11, 559.27

[56] References Cited

U.S. PATENT DOCUMENTS

| | | | |
|---|---|---|---|
| 5,392,118 | 2/1995 | Wickramasingle | 356/355 |
| 5,403,433 | 4/1995 | Morrison et al. | 356/381 |
| 5,469,361 | 11/1995 | Moyne . | |
| 5,587,792 | 12/1996 | Nishizawa et al. | 356/346 |
| 5,604,581 | 2/1997 | Liu et al. | 356/73 |

OTHER PUBLICATIONS

Real–Time Measurement of Film Thickness, Composition, and Temperature by FT–IR Emission and Reflection Spectroscopy, Solomon et al, Semiconductor Characterization–Present Status and Future Needs, Editors Bullis, Seiter and Diebold, AIP Press, pp. 545–548, 1996.

Primary Examiner—F. L. Evans
Attorney, Agent, or Firm—Ira S. Dorman

[57] ABSTRACT

A fast and practical method for the analysis of patterned samples of semiconductor integrated circuits, and other materials, determines the thickness and composition of layers fabricated during manufacture. The method employs a measurement spot that is sufficiently large to irradiate areas of two or more different regions of the sample that result from its patterned features, generally at replicable locations. In carrying out the method, one or more of reflectance, transmittance, and radiance spectrance is measured, and the various parameters characterizing the thickness and composition in the patterned areas are obtained using, for example, a model-based analysis of the polarization and amplitude of the emanating radiation, the model parameters being iteratively adjusted to achieve a match with measured values. The method can be made fast and practical by using measurements that are taken both before and also after treatment steps are effected, and/or by using measurements from the same location on designated samples undergoing the same process, to reduce the number of unknown parameters in a reference model.

33 Claims, 7 Drawing Sheets

SPECTROMETRIC METHOD FOR ANALYSIS OF FILM THICKNESS AND COMPOSITION ON A PATTERNED SAMPLE

STATEMENT REGARDING GOVERNMENT INTEREST

The United States Government has rights in this invention under National Science Foundation Contract No. DMI-9460472.

BACKGROUND OF THE INVENTION

During the last few decades, the microelectronics industry has succeeded in building increasing amounts of computing power into smaller and denser device geometries on integrated circuit (IC) chips. The advent of dense, large-scale integration has favored the metal-oxide-field-effect transistor (MOSFET) over the bipolar transistor among the devices used in ICs. In many cases there are practical advantages to making the "metal" electrode in the MOS device of poly-silicon. Critical to the development, production and final performance of advanced IC's is the precise control of the poly-silicon layer thickness and the doping density. The poly-silicon layer is typically sandwiched between two $SiO_2$ layers, i.e., a thermal $SiO_2$ layer and a cap $SiO_2$ layer.

Recent developments in microelectronics manufacturing have emphasized highly flexible single-wafer poly-silicon processes, effected in cluster tools. In current practice, process monitoring and control is provided by post-fabrication metrology, performed outside the cluster tool, for the evaluation of film thickness, doping density, uniformity, and defects. The lack of in-line diagnostics, i.e., of data obtained in real-time from within the cluster tool, results in higher manufacturing costs due primarily to the high proportion of off-spec wafers that are produced, excessive material consumption, and undue personnel requirements. The long turnaround times imposed by off-line metrology also result in lower yields and slower learning curves for new processes and products. In order to fully benefit from the implementation of the cluster tool concept, more and better in-line and in situ process monitoring and control instrumentation is needed.

Due to the complexity of the thin film materials utilized in modern electronic, magnetic, and optical devices, in-line process monitoring is difficult to achieve. Among the many problems that are associated with present techniques are the following: 1) Commercial processes currently rely upon reflectance measurements using visible or near infrared light, making in-line analysis of, in particular, polysilicon problematic. This is so because the near-IR and visible optical properties (i.e., n and k) of silicon are highly dependent upon crystallinity, meaning that short wavelength measurements cannot reliably determine accurate thicknesses for as-deposited poly-silicon films, which often contain sample-dependent, spatially varying mixtures of amorphous and poly-crystalline phases. 2) Visible wavelength techniques are insensitive to doping density, and other standard techniques for doping measurements, such as secondary ion mass spectroscopy (SIMS), are destructive. 3) The current techniques are incompatible with wafer-by-wafer process monitoring and control, since they cannot directly determine the poly-silicon layer thickness on a product wafer which has only thin (~100 Å) thermal $SiO_2$ or $Si_3N_4$ layers. 4) Current techniques cannot determine the thickness of a thermal $SiO_2$ layer, which is covered by layers that are opaque in the visible wavelength range; furthermore, the presence of a cap $SiO_2$ layer can interfere with measurement of the thermal $SiO_2$ layer underlying a poly-silicon film. 5) Film properties on patterned wafers can presently be determined by using a microscope objective to measure small, uniformly coated regions on the pattern, but this is expensive and time-consuming, and is subject to fundamental limitations imposed by diffraction and optical throughput. 6) Current large spot measurement techniques are not suitable for patterned wafers, because they require uniform coverage of the film stack across the entire measurement spot (i.e., blankets). 7) And finally, current techniques require high-speed, precise stage motion, pattern recognition, and auto-focusing.

U.S. Pat. No. 5,392,118, to Wickramasinghe, discloses a method for measuring a trench depth parameter of a material, which method comprises propagating source radiation around a trench and through the material, and analyzing a characteristic variation of an interference signal as a determinant of the trench depth parameter. The interference signal developing as radiation from a base of the trench interferes with radiation propagated from a top surface of the material.

U.S. Pat. No. 5,403,433, to Morrison et al., provides a method and apparatus which permit in situ determinations to be made of the temperature and optical constants of a substrate surface that is being treated, by measurements of radiance, reflectance, and transmittance. These determinations in turn provide, at any given instant during processing, compositional and other information, thereby affording highly effective feedback control of the processing conditions. The apparatus comprises an integrated, small, and relatively inexpensive instrument for process monitoring.

In U.S. Pat. No. 5,469,361, Moyne describes a generic cell controlling method and apparatus for a computer-integrated manufacturing system, which accepts manufacturing operation commands to perform a selected manufacturing operation on a selected manufacturing tool. The sequence of generic steps to be performed by the manufacturing tool is determined, in order to implement the selected manufacturing operation, and each step is used to generate operational instructions for the tool controller.

In accordance with Nishizawa et al. U.S. Pat. No. 5,587,792, the thicknesses of respective layers of a thin multi-layer film of submicron thicknesses can be nondestructively measured exactly and stably without direct contact. An interference waveform dispersion spectrum of light reflected from the multi-layer film is compared to a waveform obtained by numerical calculation using an optical characteristic matrix. Respective layer thickness values obtained from the calculated analysis of the spatial interference waveform are subjected to waveform fitting with actually measured values. The theoretical interference spectrum is recalculated while changing approximate values of the layer thicknesses until a match is obtained to obtain precise respective layer thicknesses.

U.S. Pat. No. 5,604,581, to Liu et al., provides a method by which the thickness and the free carrier concentration of at least one layer of a structure are determined. An exposed surface of the structure is irradiated using spectral radiation, and the measured reflectance spectrum is compared to a calculated spectrum. Using algorithms that include terms representative of complex refractive indices, layer thickness, dielectric constants, and free carrier concentrations, values are iteratively assigned to the thickness and free carrier concentration parameters so as to produce a best fit relationship between the compared spectra, and to thereby determine those parameters.

In an article entitled "Real-Time Measurement of Film Thickness, Composition, and Temperature by FT-IR Emission and Reflection Spectroscopy," Solomon, P. R., Liu, S., Rosenthal, P. A., and Farquharson, S. (*Semiconductor Characterization— Present Status and Future Needs*, Ed. Bullis, Seiter and Diebold, AIP Press, pp 545–548, 1996) discuss the methodology, hardware, and software used to perform on-line or at-line monitoring of thin film parameters, i.e., thickness, temperature, and composition (wavelength dependent dielectric function, doping density, impurities, etc). Measurements of combined thickness and composition are made using Fourier transformed infrared reflection spectroscopy.

SUMMARY OF THE INVENTION

It is a broad object of the present invention to provide a novel method for evaluating concurrently two or more different regions of a patterned sample to obtain information as to the thickness and/or the composition of at least one layer of each region.

Related broad objects of the invention are to provide a novel method for the production and management of an article, utilizing an evaluation of the character described, as well as to provide novel apparatus for fabrication of an article, which apparatus includes integrated means for effecting such an evaluation.

Additional objects are to provide such a method and apparatus by which at least some of the above-noted problems, associated with the present techniques, are avoided or at least reduced substantially.

It has now been found that certain of the foregoing and related objects of the invention are attained by the provision of a method for evaluation of the thickness and/or the composition of at least one layer of a patterned sample, which method includes the following steps: providing a patterned sample comprised of at least first and second regions, each such region in turn being comprised of at least one layer having parameters that distinguish the regions from one another and are attributable to its dielectric function, its thickness, or both; irradiating a spot on a surface of the patterned sample which includes areas of both of the first and second regions, but that constitutes only a portion of the sample surface; measuring radiation emanating from the irradiated spot to obtain spectral data; providing at least one reference spectrum having features that are indicative of values for the foregoing parameters, for characterizing one or more layers of both regions of the sample as well as the magnitudes of the spectral contributions from each area to the measured spectral data; comparing the reference spectrum (or spectra) to the measured spectral data, as appropriate and necessary to achieve a substantial fit to the measured spectral data; and using the result to evaluate the parameters of the layers of the sample being analyzed. An iterative comparison routine will be employed in many instances.

In certain embodiments of the method, the reference spectrum employed will comprise a simulated spectral model constituted of at least first and second submodel spectra, each such submodel spectrum being indicative of values for the parameters of the "at least one layer" of one or the other of the first and second regions of the sample (i.e. one of the submodel spectra relates to the first region, and the other relates to the second region), the spectra corresponding to the spectral contributions, from those respective regions, to the measured spectral data. In other embodiments the reference spectrum or spectra (i.e., including additional reference spectra, having the same indicative features, which may be provided) may comprise a library of spectra indicative of the layer parameters, or it or they may comprise the spectrum or spectra of one or more reference samples. The emanating radiation may be reflected radiation, transmitted radiation, emitted radiation, or any appropriate combination thereof; measurement of reflectance values will however usually represent the preferred mode of operation. Although the spot may have virtually any shape it will typically be elliptical, and if it is substantially circular (i.e., a special case of an ellipse) it may desirably have a diameter of about 1 to 10 millimeters; the spot will typically encompass many discrete areas of the patterned sample.

A first region of the sample may include physical structure (e.g., trenches) that is small in comparison to the wavelength of the radiation employed in the irradiation step. If, in such instances, the dielectric function of that region is to be measured, a feature of the reference spectrum may constitute an averaged value which includes a component that is representative of the comparatively small physical structure. This represents an alternative to the technique described in the above-identified Wickramasinghe patent.

Other objects of the invention are attained by the provision of a method for the production and management of an article. In addition to the steps previously described, such a method includes a step of subjecting at least part of the surface of a sample to treatment for effecting its modification, so as to thereby produce an article comprised of at least first and second distinguishable regions, each of which regions includes at least one layer having parameters that are attributable its dielectric function, its thickness, or both. The evaluation that results from the comparison, made as previously described, is employed for subsequent management of the article produced.

More particularly, the modification effected by treatment of the sample will normally comprise the deposit of a film of material on the treated part of the surface, or the removal of material from the surface (e.g., by etching). The management step may constitute a simple pass/fail operation, in which the article produced is either accepted or rejected, or it may comprise control of the treatment carried out, either to correct a sensed drift away from established criteria or to achieve specific values for the operative parameters.

The steps of the method may be carried out successively on each of a series of is samples or articles, with one of the articles thereby produced providing the reference article for subsequent iterations of the method. In such a method, the measured spectral data may be subtracted from, or divided into, the spectrum of the reference article, to provide a difference spectrum or a ratio spectrum, respectively; the reference spectrum (compared in the comparing step with the difference spectrum or the ratio spectrum) will, in such embodiments, be a model for the difference spectrum or for the ratio spectrum, as the case may be. The series of articles may be made in a single, substantially continuous operation, or they may be produced in different iterations of the process. As an essentially empirical technique, a series of articles conforming to required criteria may be used to provide a band of reference spectra, within the limits of which band a substantial fit of the measured radiation must occur in order to deem the article produced satisfactory. Generally, all samples and/or articles that are treated or produced in a particular implementation of the process will be brought to a common location for carrying out the irradiation and measuring steps.

In a particularly desirable embodiment of the method, the analysis of a sample may be carried out using irradiation and measuring steps effected both before and also after modification of its surface, the irradiated surfaces being substantially aligned. In such a method either a differential or a ratio relationship is established between the two sets of measured spectral data so acquired, and a relational spectrum is produced that is indicative of the sets of measured spectral data, as so related. The relational spectrum is compared to the reference spectrum or spectra provided, to achieve a substantial fit, and at least one of the parameters of at least one layer of each of the first and second regions of the article, as so modified, is thereby evaluated and utilized for subsequent management of the article.

In a specific embodiment of the production and management method described, the irradiating steps are effected using infrared radiation, the emanating radiation is reflectance, pseudo dielectric functions are defined in the initial comparison step, the treatment comprises depositing a film of material upon the defined part of the surface, the "at least one subsequently utilized reference spectrum" is a simulated spectral model constituted of at least first and second submodel spectra, and the values of the parameters are iteratively adjusted, during the subsequent comparison step, so as to determine values for the dielectric functions and thickness of the film in the first and second regions, as well as for the relative size of the areas. One of the submodel spectra of the simulated spectral model will include parameters that are indicative of the dielectric function and thickness of the "at least one layer," as so modified, and the first and second submodel spectra will correspond to the spectral contributions from the first and second areas, respectively, to the measured spectral data. In carrying out such a method, the pseudo dielectric functions will advantageously be determined from test samples previously produced.

Further objects of the invention are attained by the provision of apparatus for the fabrication of an article comprising, in integrated combination: means for treating at least a portion of a substrate to effect surface modification thereof; means for evaluating at least one of the thickness and the composition of layers of which an article is comprised; and control means operatively connected to the evaluating means and the treating means for controlling the operation of the treating means based upon a signal received from the evaluating means. The evaluating means will preferably comprise a Fourier transform infrared spectrometer, and will include: means for irradiating a spot on a surface of an article contained in the apparatus; means for measuring radiation emanating from the irradiated spot to obtain spectral data; means for providing at least one reference spectrum having features that are indicative of values for the dielectric function and/or the thickness of at least one layer of each of first and second regions irradiated by the spot, and of the magnitudes of the spectral contributions from each area within the irradiated spot; means for comparing, to the measured spectral data, the reference spectrum or spectra provided, as necessary to achieve a substantial fit to the measured spectral data; and means for using the result of the comparison for evaluation of the applicable parameters and for generating a signal indicative thereof. Generally, the apparatus will additionally include means for transporting the work-piece between the treating means and the evaluating means, and more particularly among all of the stations of which the apparatus (e.g., a cluster tool) is comprised.

BRIEF DESCRIPTION OF THE DRAWINGS

In each of FIGS. 4, and 6 through 8, the numbers along the abscissae are wavenumbers ($cm^{-1}$), and the numbers along the ordinates represent reflectance values.

DETAILED DESCRIPTION OF THE ILLUSTRATED AND PREFERRED EMBODIMENTS

Figure 1:
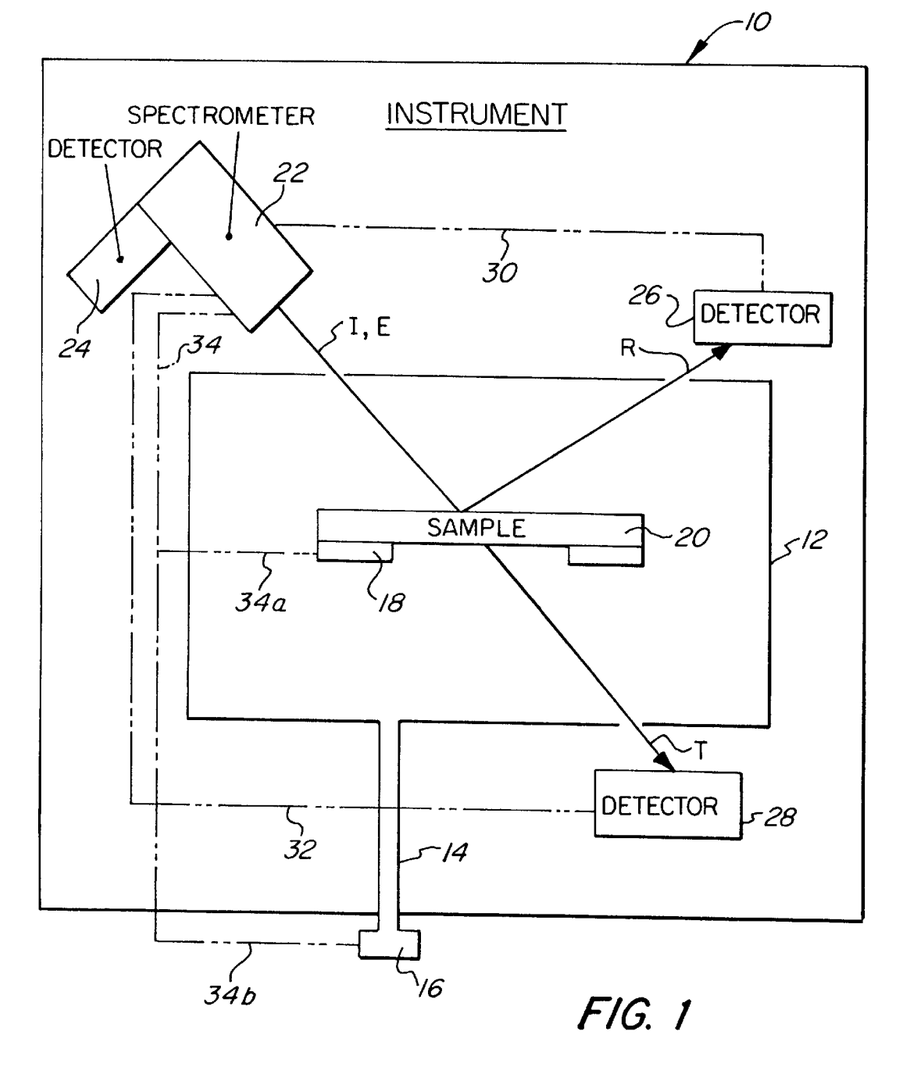
FIG. 1 is a diagrammatic illustration of an instrument that is broadly characteristic of the apparatus embodying the invention.

FIG. 1 of the drawings shows diagrammatically an instrument, generally designated by the number 10, which includes a sample compartment 12, connected by a conduit 14 to a valved gas supply 16, a support 18 which serves to support the sample or substrate 20 during processing, and a Fourier transform infrared (FT-IR) spectrometer 22 (including a computer, usual optics, interferometer, and all of the other conventional components thereof). A detector 24 is operatively connected to the spectrometer 22 for measuring emittance from the surface of the sample 20, and a reflectance detector 26 and a transmittance detector 28 are operatively connected thereto by lines 30 and 32, respectively. A line 34 leads from the spectrometer to the heating element of the sample support 18 and the valve of the gas supply 16, through branches 34a and 34b, respectively, operatively connecting them for control by the spectrometer 22.

As indicated by the letters I and E, the incident radiation impinging upon the sample 20, and the radiation emitted thereby, follow the same path from and to the spectrometer 22. Reflected radiation follows path R to the detector 26, and transmitted radiation follows path T to the detector 28. Techniques for using such beams, for evaluating parameters of a sample and an ambient gas (if so desired), and for utilizing the data so obtained for feedback control, are described in greater detail in the above-identified Morrison et al. and Liu et al. patents, the disclosures of which are therefore incorporated hereinto by reference thereto.

Figure 2:
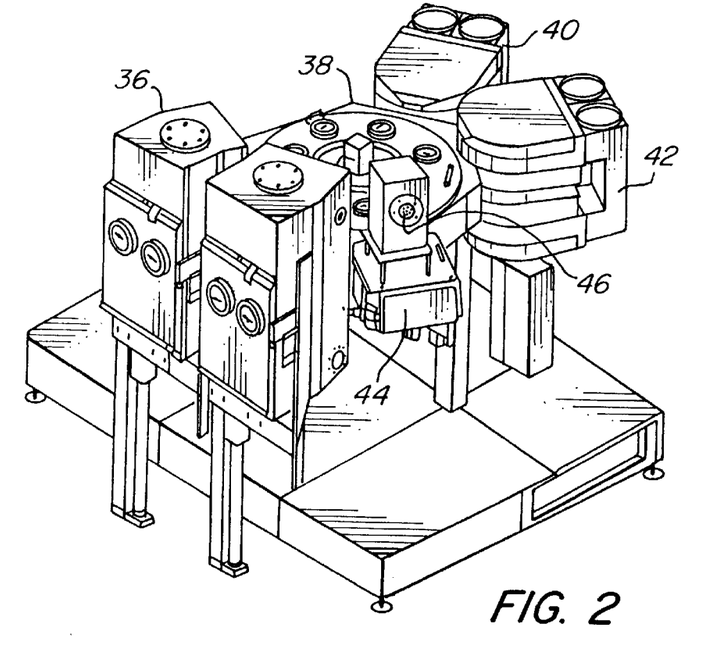
FIG. 2 is a diagrammatic illustration of a cluster tool embodying the present invention.

Turning now more specifically to FIG. 2, therein illustrated is a cluster tool, suitable for use in the fabrication of IC chips and embodying the present invention. The tool consists of a load lock unit 36, a chamber 38 containing a transfer robot (not seen) for moving the workpiece among the several stations of the tool, a rapid thermal oxidation unit 40, a film deposition chamber 42, and a cool-down chamber 44. An FT-IR sensor 46 (e.g., a detector 24, 26, and/or 28) is mounted on the cool-down chamber 44, and is operatively connected to an FT-IR spectrometer of conventional design (e.g., spectrometer 22). Details of the components of the tool, the interconnections thereamong, and the electronic data processing means that is provided for operation and control thereof, are not shown but will be evident to those skilled in the art, particularly in light of the description set forth herein. Needless to say, when employed in an embodiment such as that of FIG. 2, the sample compartment 12 of FIG. 1, and its associated features, would be arranged and distributed appropriately among the several components of the cluster tool.

Figure 3:
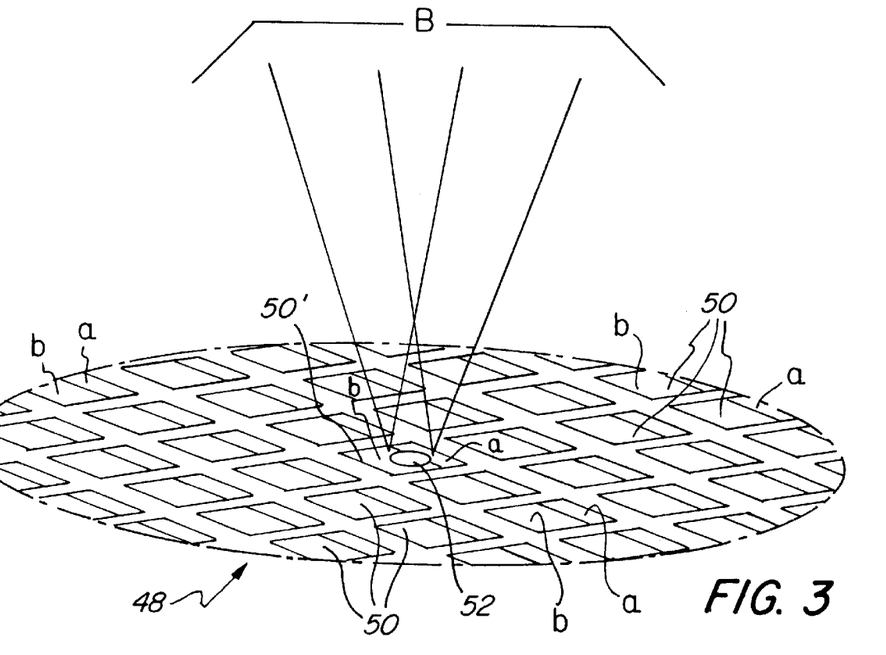
FIG. 3 is a diagrammatic isometric view depicting, in a greatly simplified form, a series of identical patterned IC chips defined on a fragmentarily illustrated wafer, the two areas comprising one of the chips being illuminated by a measurement spot in accordance with the invention.

FIG. 3 depicts diagrammatically a section of an IC wafer, generally designated by the numeral 48, on which have been formed numerous, identical chip structures 50, each having two regions "a" and "b". An irradiation beam B (e.g., radiation I of FIG. 1) produces a circular spot 52 on the surface of the wafer 48, which encompasses an area of each region "a" and "b" of the chip structure 50'. It will be appreciated that the depiction of FIG. 3 is highly simplified; in practice, the chip structures are very fine grained and comprised of numerous distinct areas, many of which would be encompassed within by the spot 52.

As will be noted, the measurement spot 52 encompasses only a fraction of the total surface of the wafer 48, and only a portion of the surface of the chip 50'. In a case such as this (in which a wafer is divided into an array of chips), the percentage of the surface of a single chip that is covered will typically be 1 to 75 percent, albeit a spot large enough to cover the entire chip may be employed if the spacing is such that the presence of adjacent structure would not adversely affect the measurement being made.

Figure 4:
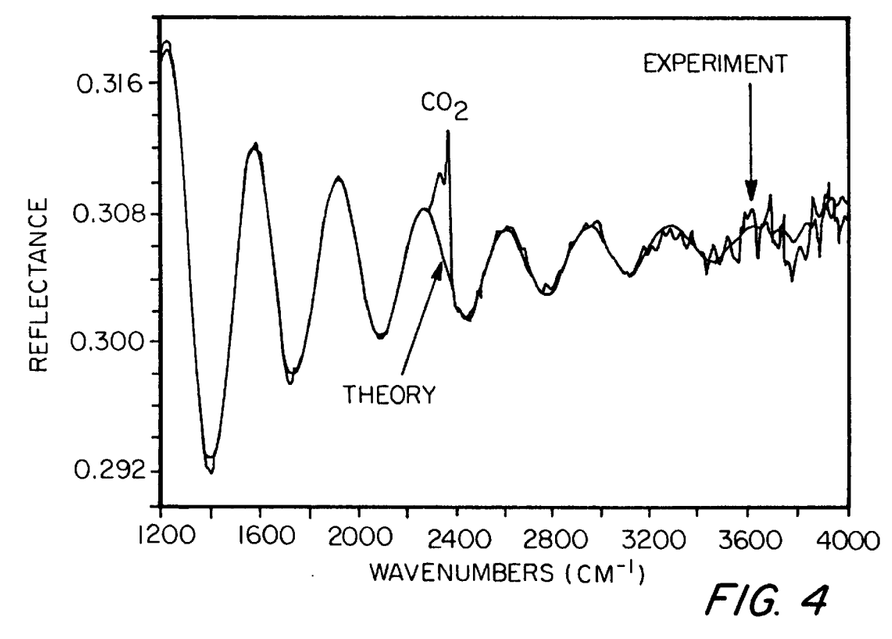
FIG. 4 is a diagram showing theoretical and experimental reflectance spectra for an epitaxial film deposited upon a silicon substrate.

One overall approach to IC wafer fabrication in accordance with the present invention, using FT-IR spectroscopy, entails the following: 1) A thin film patterned sample or article is measured by FT-IR reflectance, from an irradiated spot comprising areas of at least two regions thereof, immediately after deposition of the film on a surface of a substrate or sample; 2) the FT-IR spectrometer supplies reflectance data as a function of wavelength, to analysis software; 3) a simulated spectrum is computed from parametric models for the doping profile, the material's dielectric functions, and a multi-layer reflectance model; and 4) the model parameters are iteratively adjusted to fit the measured spectrum. An example of the reflectance analysis for an epitaxial layer, using a model created in accordance with the invention of the above-identified Liu et al. patent, is presented in FIG. 4. As can be seen, a very close correlation between the theoretical (solid line) and experimental (broken line) values is indicated. The spike in the experiment curve, in the 2400 wave numbers region, indicates the presence of carbon dioxide.

Figure 5A:
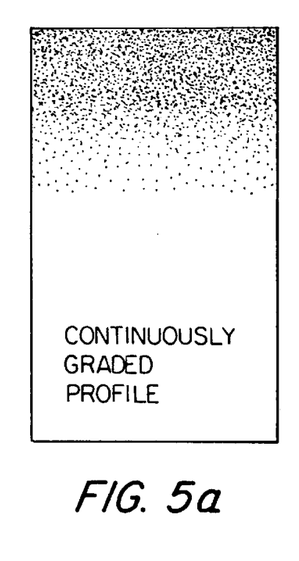
FIG. 5 is a diagram illustrating reflectance from a film stack in respect of (a) a continuously graded film, (b) a discrete multi-layered stack, and (c) a multi-layer film stack model.
Figure 5B:
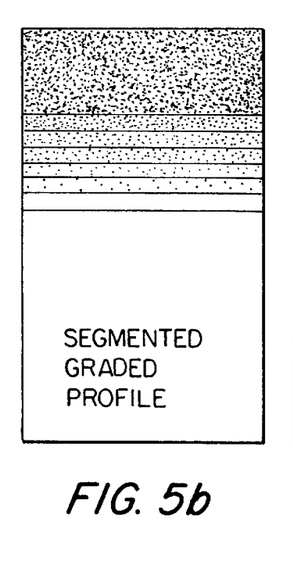

A key innovation in the method, again as applied to FT-IR analysis, is that it captures the essential physics of the infrared reflectance, using accurate models for the composition profile and the dielectric function (DF), with relatively few adjustable parameters. This reflectance model enables computation of the infrared reflectance of samples with multi-layered and graded compositional profiles, using transfer matrix formalisms described in the literature (see Buffeteau, T., and Desbat, B., *Applied Spectroscopy*, Vol. 43, No. 6, 1989, 8pp 1027–1032; and Abeles, F., *Advanced Optical Techniques* [North Holland, Amsterdam, 1967], Chap. 5 p. 143). As illustrated in FIG. 5, continuously graded films (section a) are modeled by segmenting them (per section b), and specifying a DF for each sub-layer based on its composition (section c). The DF models, which include dispersion and absorption due to free-carriers, phonons, impurities, and interband transitions, compute the wavelength-dependent complex DF. The models are tailored to the unique optical and electronic properties of each material (see the Solomon et al. article and the Liu et al. patent, supra).

Gauge tests demonstrate the relative accuracy of analyses of epi layer thickness, performed in accordance with the foregoing, to be in the range of 1 to 2 nm. Comparison to SIMS and SRP measurements (which are of course destructive methods) show absolute accuracy to be comparable.

Figure 5C:
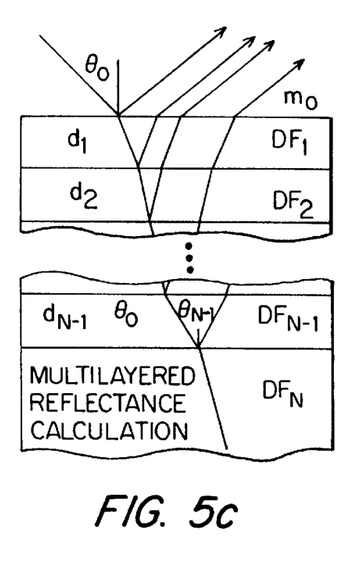

An analysis method for multi-layered silicon and dielectric films, applicable in carrying out the present technique, utilizes a general multi-layer reflectance model which can include an unlimited number of layers, each layer having its own dielectric function; the model follows the transfer matrix computing formalism developed by Abeles, and the general guidelines given by Buffeteau and Desbat (op. cit. supra). As shown in FIG. 5c, the multi-layer system is assumed to have N layers (excluding air), with the last layer N (the substrate) being of infinite thickness. Each layer is characterized by a matrix which depends on the layer thickness and dielectric function, and which relates the electric and magnetic fields at its two boundaries. The total reflectance is obtained from the characteristic matrix of the entire multi-layer system (which is equal to the product of the characteristic matrices for each layer).

A theoretical model serves to compute the complex dielectric function of silicon as a function of frequency and doping density, and is then used to calculate the reflectance spectrum for the chosen doping profile. The complex dielectric function $\in$ for the film and substrate is expressed using a Drude term to account for the free electron motion (Bohren, C. F., and Huffman, D. R., *Absorption and Scattering of Light by Small Particles*, John Wiley & Sons, 1983):

$$\epsilon_s = \epsilon_b - \frac{\frac{4\pi N e^2}{m^*}}{\omega^2 + i\omega\gamma}$$

where e is the charge of one electron, m* is the effective electron mass, $\omega$ is the IR frequency in radians/sec, $\gamma$ is the width of the Drude term (or scattering rate), and N is the carrier concentration. The product $(4\pi Ne^2/m^*)$ is the doping-dependent squared free carrier plasma frequency, and $\in_b$ represents the contribution to the dielectric function due to all bound charges. All the phonon modes and electrically inactive impurity modes can be included in $\in_b$, and it can be determined from infrared reflectance or transmittance analysis of undoped silicon. In the case of polysilicon, it is expected that the scattering rate $\gamma$ will be different from that of crystalline silicon due to the effect of grain boundaries, and its value can be estimated from measurements and analyses using the n-layer model. Optical constants for $SiO_2$ are provided in the *Handbook of Optical Constants of Solids*, E. D. Palik, Ed., Academic Press, Inc. (1985).

An automated procedure may be used in performing the method of the invention, in which procedure the measured reflectance spectra are compared to spectra simulated using the n-layer model. The procedure iteratively adjusts the model parameters to obtain a best fit, thereby extracting the optimal model parameters; the Levenberg-Marquardt method can be used to perform the non-linear regression analysis (Press, W. H., Flannery, B. P., Teukolsky, S. A., Vetterling, W. T., *Numerical Recipes*, Cambridge University Press, 1992). The model is so designed that any parameter can be a fitting parameter if necessary, thus allowing the adjustment of parameters that may not be known or available, such as the carrier scattering rate. Typically, the fit is done using up to four fitting parameters, and includes mostly the thicknesses and the doping densities of the layers. When more parameters are unknown, a multi-step procedure is used; i.e., fitting a first set of parameters first, fitting a second set while keeping the first set at constant values, then going back to fit the first set while holding the second set constant, etc., until a good fit is achieved.

The ability to perform routine in-line diagnostics on patterned wafers during production will greatly expand the value and utility of such diagnostics. The present method accounts for the pattern of the wafer (or other sample or article) by assuming that the radiation emanating from the irradiated spot is generated by at least two (and usually more) different zones or regions in the wafer, each zone having a different thickness for one of the layers (generally, an underlying layer) while all the other layers are the same. The calculation is performed by running the n-layer model twice; i.e. once for each of the two zones, and weighting the reflectance (or other emanating radiation) of each zone proportionally to its area fraction (as encompassed by the irradiated spot). Compared to known n-layer models, the resulting "patterned-n-layer" model includes extra parameters; i.e., the thicknesses of the layer, which are different in the two zones, and the relative encompassed area fraction of the two zones. If these parameters are fairly well known, it is anticipated that the model will, in most instances, perform as well as an n-layer model to extract parameters. Due to the simplicity of the algorithm, the patterned-n-layer model can be easily extended to more than two zones.

Figure 6:
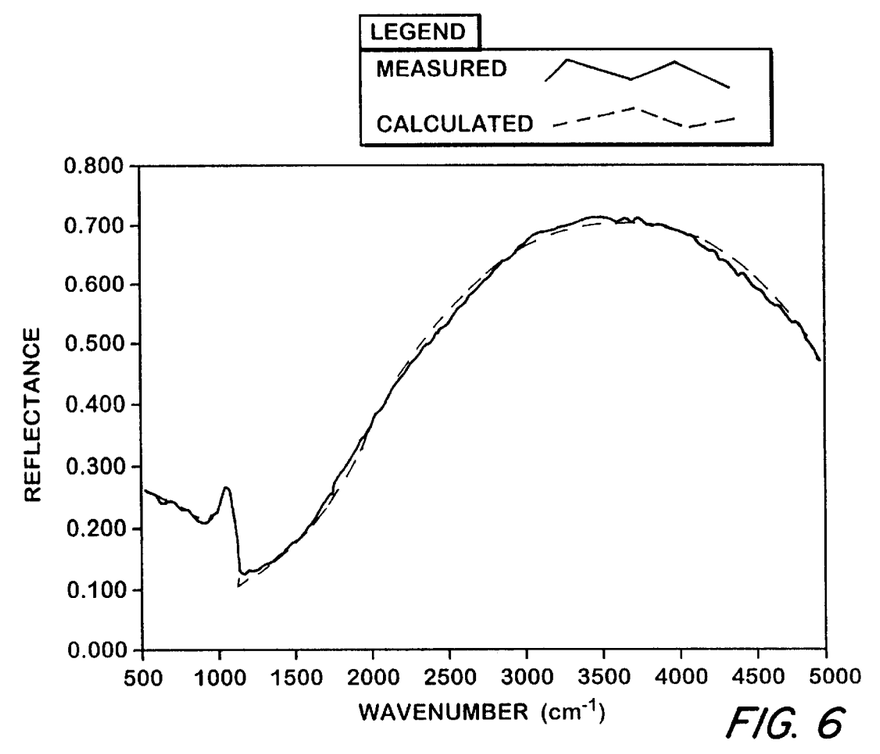
FIG. 6 is a diagram showing curves of experimental and predicted reflectance for a structure comprised of a substrate, a field oxide, and a poly-silicon film.

More particularly, the algorithm expressing the total radiation S for a two zone sample is:

$$S = a_1 S_1(DF_{1j}, t_{1j}) + a_2 S_2(DF_{2j}, t_{2j}),$$

wherein the irradiated area fractions of the zones are $a_1$ and $a_2$, and the radiation contributions (as functions of the dielectric function and thickness of the $j^{th}$ layers) are $S_1$ and $S_2$. For samples on which N areas (i.e., more than two regions on the surface of the sample or article) are encompassed by the irradiated spot, S would simply constitute a summation of the proportionate contribution from each area. FIG. 6 shows a manually performed n-layer model fit for a patterned wafer having the structure: poly-Si/SiO$_2$/Si, with two zones, each zone corresponding to a different SiO$_2$ layer thickness on top of the same substrate and covered with the same poly-Si; analysis is by FT-IR reflectance, with an irradiated spot of about 6 mm, and measured and calculated values are depicted as full and broken line curves, respectively. The fitting parameters employed were $Z_{poly}$, $Z_{SiO2}$ (zone 1) for the thin layer of SiO$_2$, $Z_{SiO2}$ (zone 2) for the thick layer of SiO$_2$, and the area fraction of one of the zones (zone 1); $Z_{SiO2}$ (zone 1) was kept constant at the expected value of 60 Å. While the thicknesses of the poly and thick SiO$_2$ layers and the area fractions of the two SiO$_2$ zones were not known with precision, the model provided reasonable values for those parameters. Due to some compensation effects, however, it was found that some of the parameters were not independent, and that several combinations of parameters were equally acceptable. For example, the spectrum could be equally well fit by decreasing the area fraction of the thick-SiO$_2$ zone together with increasing its thickness. Even when the relative area fraction of the thicker oxide zone was changed from 90% to 97% of the total area, however, the extracted thickness of the overlying poly film varied by less than 3% (7 nm). This suggests that the thickness analysis of poly films on patterned product wafers will be relatively insensitive to uncertainties in the pattern, and therefore nearly as accurate as that on unpatterned pilot samples.

Figure 7:
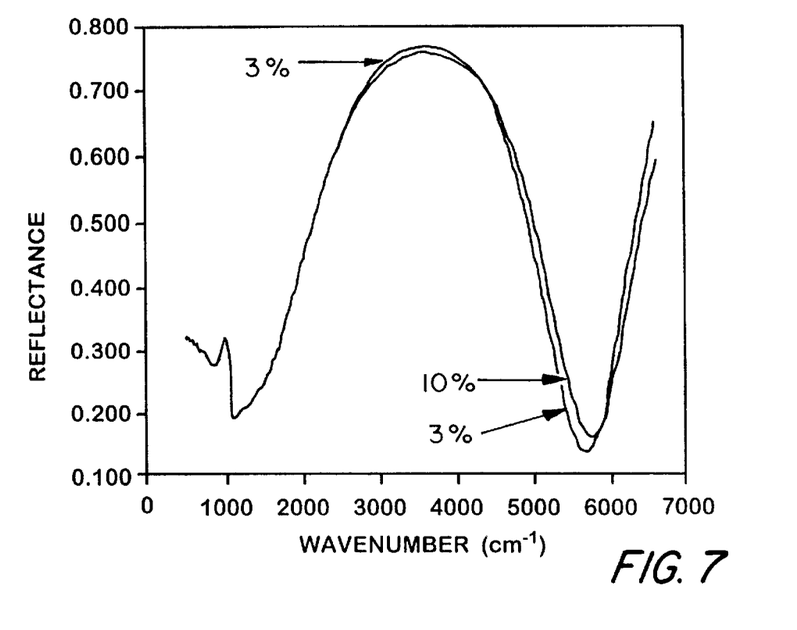
FIG. 7 is a diagram of curves showing predicted reflectance for a patterned sample, with two different sets of parameters.
Figure 8A:
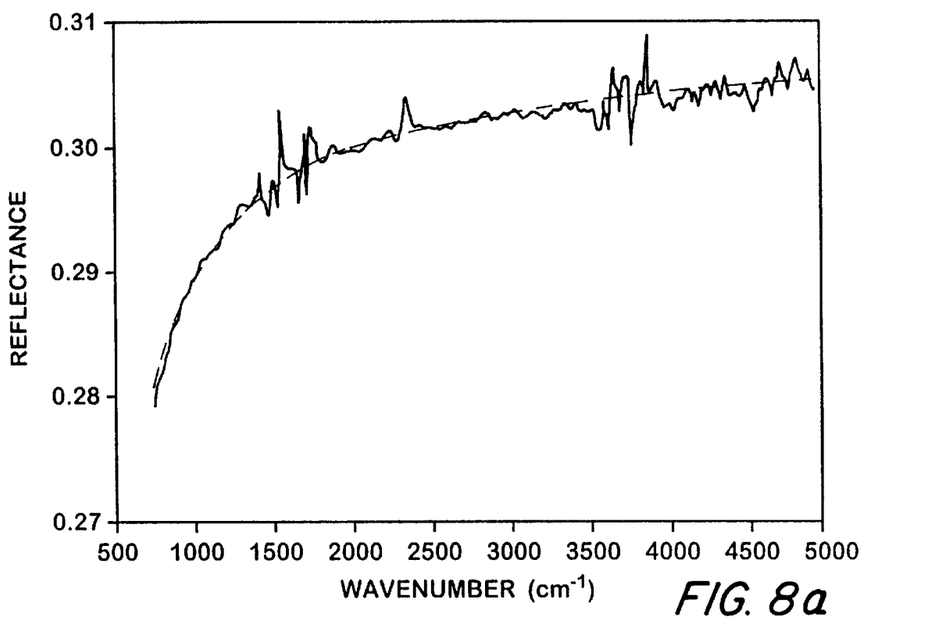
FIGS. 8(a)–8(f) comprise curves showing successive fits of experimental reflectance for (a) a bare wafer, (b) the cleaned wafer, (c) the oxidized wafer, at a limited range of wave numbers, (d) the oxidized wafer at a broader range of wave numbers, (e) the oxidized wafer carrying a poly-silicon deposit, under a first set of parameters, and (f) the same wafer under a second set of parameters.
Figure 8B:
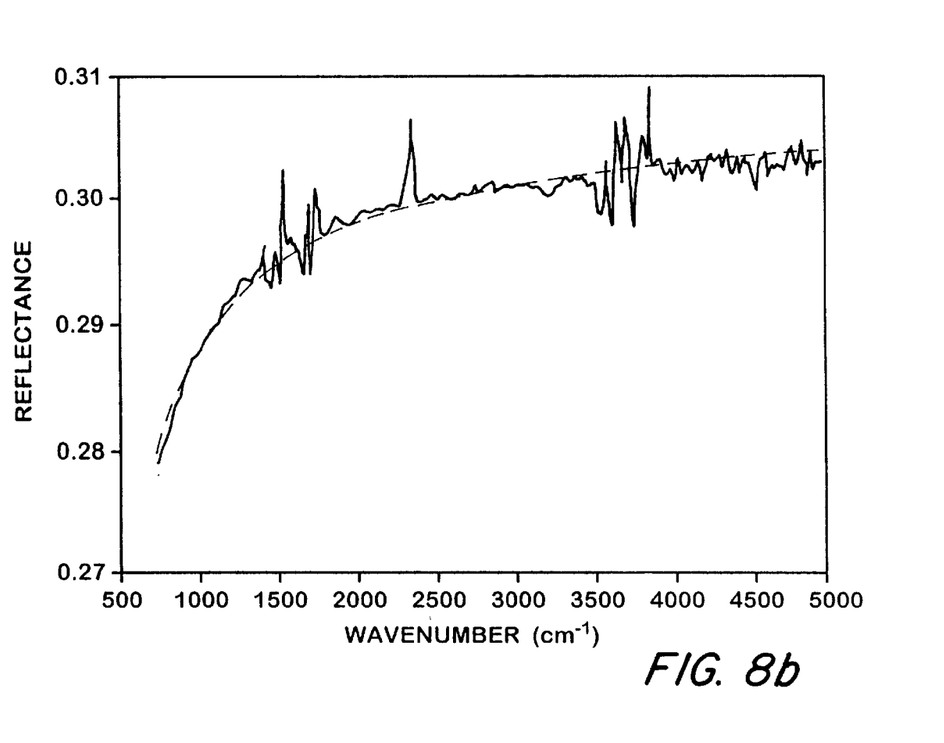
Figure 8C:
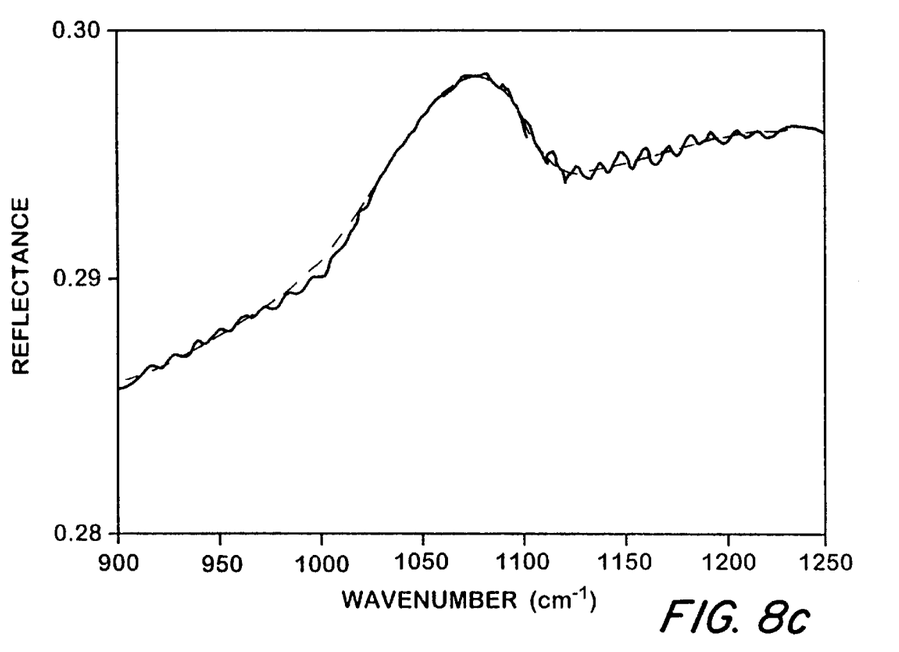
Figure 8D:
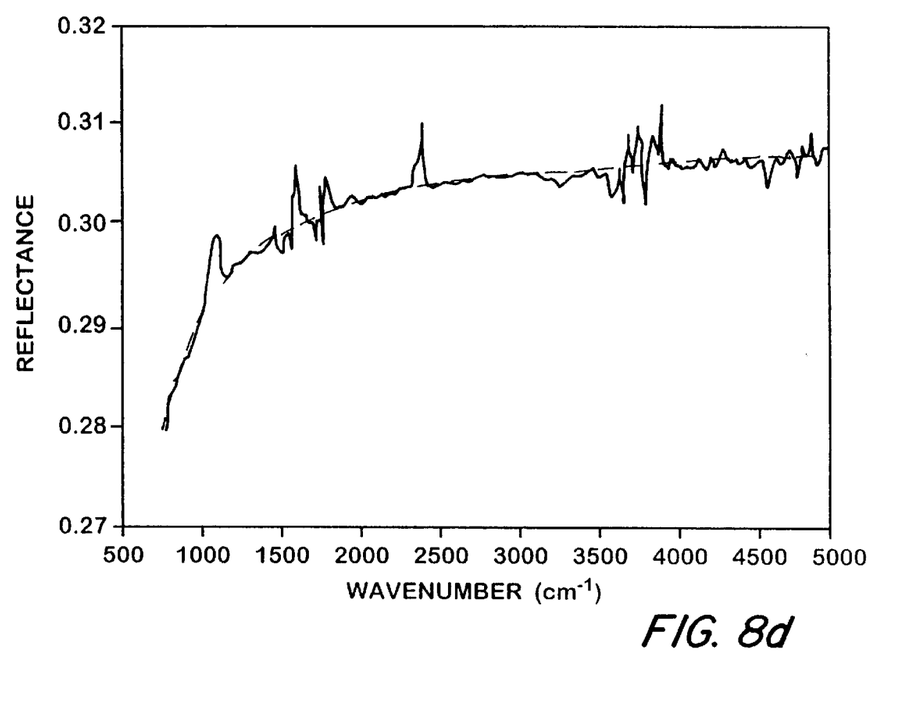
Figure 8E:
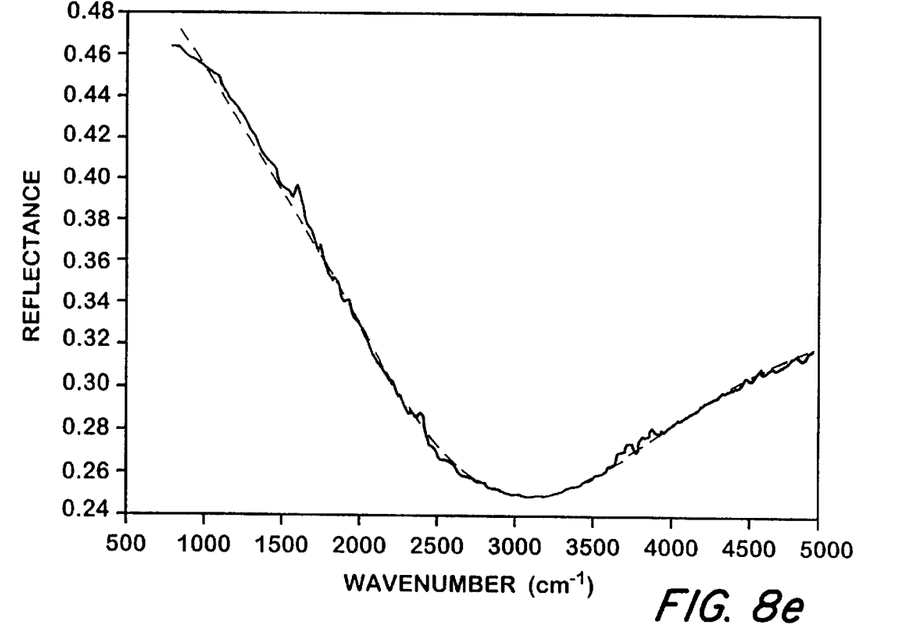
Figure 8F:
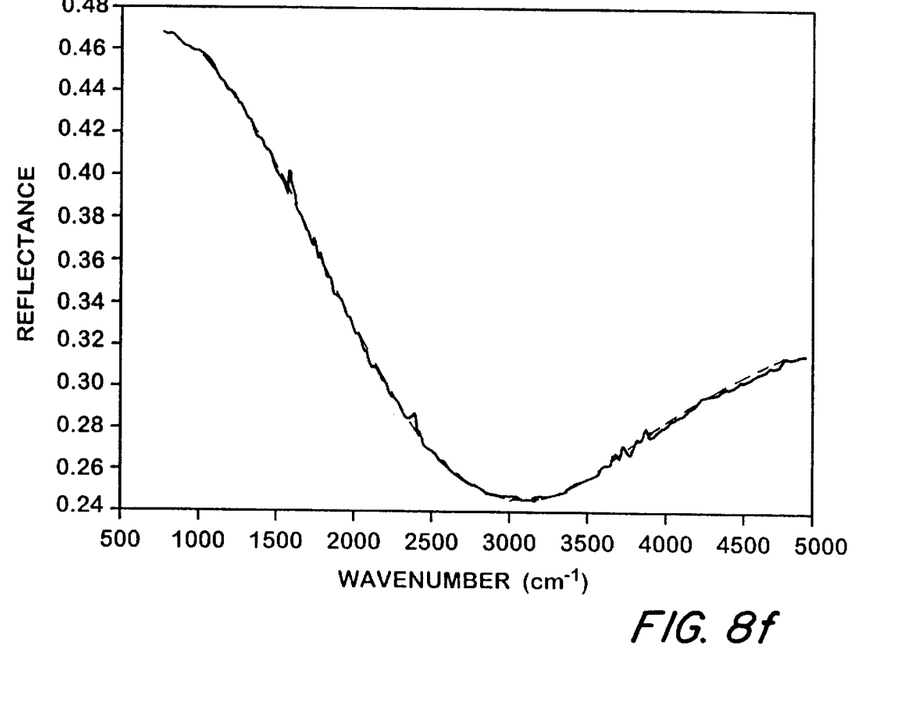

When the area fraction is not well known a priori, and the fits are inconclusive, the analysis can be improved by expanding the wavelength range; that is so because the reflectance predictions using different area and thickness parameters diverge increasingly at higher wavenumbers. FIG. 7 shows the effect of varying the SiO$_2$ thickness and the area fraction of the corresponding zone for two sets of parameters. Specifically, one parameter set was $Z_2=2400$ Å, $f_{area2}=90\%$, $f_{area1}=10\%$, and $Z_{poly}=2630$ Å; the other set was $Z_2=2200$ Å, $f_{area2}=97\%$, $f_{area1}=3\%$, and $Z_{poly}=2700$ Å. As can be seen, at high wavenumbers the two curves diverge significantly, while at low wavenumbers they are essentially identical.

The method of the invention can also be enhanced by the use of a feed-forward analysis; i.e., by performing the analysis at judiciously chosen sequential steps of the process (rather than on the final structure only). Information about layers from previous steps may be used to fix the values of certain parameters for subsequent analyses, and thereby to improve the robustness of the analysis. Moreover, the approach to analyzing patterned wafers described may of course be refined, extended, and automated.

For example, the algorithms may be so constructed as to allow dividing patterned wafers schematically into multiple zones, each with its own film stack specification and each covering a different fractional area on the wafer. Individual parameters within the film stack of each zone, as well as the relative area fraction of the zone, will be selectable as either fitting or fixed parameters during the analysis. Feedforward analysis algorithms may also allow data obtained in previous processing or analysis steps to be incorporated in subsequent automated analysis steps. For example, field and gate oxide thicknesses can be measured before poly-silicon deposition, and incorporated into the poly-silicon analysis as fixed parameters, thereby reducing the number of free-fitting parameters that are to be determined simultaneously and, in turn, improving the robustness of the analysis.

To illustrate the latter procedure, an experiment was performed in which a bare silicon wafer was measured, cleaned in a hydrogen fluoride vapor, remeasured, processed to grow a gate oxide, remeasured, and finally covered with a doped polysilicon film and again remeasured. Each of these steps was monitored, and the reflectance was measured and analyzed in situ in the cool-down chamber of the apparatus employed (e.g., the apparatus of FIG. 2). The reflectance data for the sample at various stages was analyzed using the n-layer model described hereinabove. Parameters such as the carrier concentration $N_s$ and scattering rate $\gamma_s$ of the substrate, the thickness of the gate oxide $Z_{SiO2}$, and the thickness $Z_{poly}$, carrier concentration $N_{poly}$, and scattering rate $\gamma_{poly}$ of the deposited poly film, were determined progressively at each step of the process. FIG. 8 shows the fit at each process step and the corresponding extracted parameters (shown in parentheses); the value of a parameter which is used in subsequent steps (i.e., a fully determined value) is indicated by an asterisk. Specifically, curve (a) represents the starting condition, and shows measured reflectance of the bare wafer with $N_s$ ($2.08 \times 10^{18}$ cm$^{-3}$) and $\gamma_s$ (383 cm$^{-1}$) as parameters; curve (b) represents the first step, and shows the HF-cleaned wafer with $N_s$ ($2.06 \times 10^{18}$ cm$^{-3}$) and $\gamma_s$ (390 cm$^{-3}$) as parameters; curves (c) and (d) represent measurements of the oxidized wafer, produced in the second step, taken first (c) at 900 to 1250 wavenumbers with $Z_{SiO2}$ (75 Å)* and $N_s$ ($2.83 \times 10^{18}$ cm$^{-3}$) as parameters, and thereafter (d) at all wavenumbers with $N_s$ ($2.37 \times 10^{18}$ cm$^{-3}$)* as the parameter; and curves (e) and (f) represent the third step, with polysilicon deposited and with $N_{poly}$ ($74.02 \times 10^{18}$ cm$^{-3}$), $\gamma_{poly}$ (1947 cm$^{-1}$), and $Z_{poly}$ (0.257 $\mu$m), and $N_{poly}$ ($78.81 \times 10^{18}$ cm$^{-3}$)*, and $Z_{poly}$ (0.268 $\mu$m)*, respectively, as the parameters. The fit is performed twice for each of process steps two and three to yield parameters with more accuracy.

Although a substantially circular IR spot irradiated on the sample or article will typically be about 1 to 10 millimeters in diameter, as a practical matter it need only be large enough to include at least a portion of each area that is to be analyzed; on the other hand, the irradiated spot will usually cover only a fraction of the total surface exposed in the irradiated plane. One of the notable advantages afforded by the invention is a tolerance for inexact positioning (or repositioning after treatment) of the sample, or of the stage on which it is mounted; if the spot size is too small, however, a lack of precision may become a significant factor.

Thus, it will be appreciated that when more than a single measurement is to be taken from a given area on the surface of sample, it will generally be important to faithfully replicate the irradiation of that area; i.e., that the same area be irradiated consistently. That is not to say however that multiple spots cannot be irradiated on a single sample, such as may be desirable to perform different analyses. When a series of like samples are to be analyzed to evaluate the same parameters for the same area of each, every sample must, as a practical matter, be brought in sequence to a single, common location or position for irradiation within an inspection tool. It should also be appreciated that the regions irradiated for analysis by a single spot need not be contiguous.

As noted previously, the invention has a wide range of applications, including off-line as well as on-line metrology or inspection, albeit that off-line inspection will generally be of limited utility. The greatest benefit afforded by the technique described will often be derived from the ability that it affords for close coupling of inspection tools with fabrication tools, to increase productivity and to improve product quality. Such a system may be configured, for example, only to determine if a product satisfies predetermined criteria. Alternatively, a somewhat more refined configuration would enable quality control, such as to determine a direction of drift from established criteria and to provide a corrective feedback signal to the fabrication tool, based thereupon. More sophisticated systems may provide actual values for the thickness and/or composition of one or more layers of an article, again for either on-line wafer-state diagnostics, to control layer deposition, etching, and the like, or for off-line inspection.

The reference spectra against which the measured spectral data are compared may also take a variety of forms. They may be obtained from a set of prefabricated wafers or other empirical model, developed to indicate desirable or anticipated criteria, or from a resident library of spectra. Virtually any technique that is capable of distinguishing change and of relating it (in any way) to the state of the article may be employed for comparison of the spectra, such as a partial least squares technique, a neural network, principal component analysis, etc. As will be appreciated from the foregoing description, however, spectral models of the kind taught in the above-identified Morrison et al. and Liu et al. patents, utilized to provide a composite of submodels, will often constitute the preferred embodiment.

When implemented for mid-infrared reflectance using Fourier transform infrared spectroscopy, as is particularly preferred, the instant method and apparatus eliminate many of the problems that are associated with present techniques for in-line and at-line thin film measurements; in particular:

1) because the mid-IR optical properties of silicon are largely insensitive to crystallinity, the present invention enables accurate thickness data to be obtained for as-deposited poly-silicon films, whereas techniques currently employed require a post-annealing process or the application of a more sophisticated and time-consuming, multispectral methodology;
2) the doping density of poly-silicon films can be determined non-destructively, thus allowing for rapid in-line process monitoring and control of doping;
3) poly-silicon layer thickness can be determined directly on product wafers, even if they carry only a very thin thermal $SiO_2$ layer, and the method is adaptable to relatively exotic substrates, such as silicon-on-insulator (SOI) wafers; and
4) by correctly accounting for the optical properties of the several fractional areas of the wafer that are occupied by different structures (e.g. films on patterned substrates), process monitoring and control can be applied to actual product wafers in addition to blanket pilot wafers, thus enabling faster recognition and correction of reactor process excursions and, in turn, reducing scrap rates due to production of out-of-spec wafers.

It will be appreciated that optical film-property measurements (reflectometry and ellipsometry) in different portions of the optical spectrum (i.e., UV, visible and near IR [200–800 nm], and mid-IR [the FT-IR region of 3 to 10 microns]) afford advantages and disadvantages for different applications, and can be employed in the practice of the present invention. For all but very thin films (i.e., less than 100 nm), the wavelength range accessible with an FT-IR instrument affords accuracy equivalent to that provided by visible or UV reflectometry or ellipsometry for thickness measurements. Moreover, while FT-IR reflectometry is not as accurate as visible ellipsometry for such films, FT-IR ellipsometry will afford accuracy comparable to that which can be achieved in the visible spectral region. On the other hand, FT-IR spectroscopy is uniquely advantageous when composition information is required for unannealed samples or for multi-layer stacks, where such information improves the analysis significantly. In view of these and other factors, therefore, it should be appreciated that applications that require, or that would benefit particularly from, the use of FT-IR accessible wavelengths include the production and/or measurement of epitaxial silicon, and the determination of poly-silicon thickness (unannealed), poly-silicon carrier concentration, photoresist composition, dielectric composition, and SOI composition depth profiles (unannealed). Although, the technique of the invention is preferably carried out using an FT-IR spectrometer for acquisition of the necessary spectral data, it will be appreciated that a dispersive spectrometer, a broad band source with an array of filters or a tunable filter, an array of light sources at difference wave lengths, or a tunable light source, may also be employed.

Thus, it can be seen that the present invention provides a novel method for evaluating concurrently two or more different regions of a patterned sample or article, so as to obtain or inherently utilize information as to the thickness and/or the composition of at least one layer of each region. The invention also provides a novel method for the production and management of an article, and novel apparatus for fabrication of an article, which apparatus includes integrated means for evaluating the sample being treated and/or the article that is produced. The practice of the invention avoids, or at least reduces substantially, certain of the problems that are associated with present techniques for in-line process monitoring of the fabrication of semi-conductor integrated circuits, and the like, as noted initially hereinabove.

In preferred embodiments, the invention affords a comprehensive thin-film metrology and process-control system, which combines large spot measurements of patterned wafers with model-based spectral and statistical analyses. It offers both real-time, in-line measurements (i.e. performed within a semiconductor fabrication tool) and also rapid multi-point (i.e. mapping) at-line measurements of film thickness, composition, and electronic properties. The present concepts can be applied broadly to many of the critical electronic materials that are processed in semiconductor fabrication tools, including poly silicon, silicon dioxide, silicon nitride, and other dielectrics.

Having thus described the invention, what is claimed is:

1. A method for evaluating at least one of the thickness and the composition of at least one layer of a patterned sample, comprising the steps:
   providing a patterned sample comprised of at least first and second regions, each of said regions in turn being comprised of at least one layer having parameters that distinguish said regions from one another and that are attributable to at least one of: (1) the dielectric function, and (2) the thickness of said at least one layer thereof;
   irradiating a spot on a surface of said sample that constitutes only a portion of said surface and that includes areas of both of said first and second regions;
   measuring radiation emanating from said irradiated spot to obtain measured spectral data;
   providing at least one reference spectrum having features that are indicative of values for said parameters of said at least one layer of said each of said first and second regions, and of the magnitudes of the spectral contributions from said each of said areas to said measured spectral data;
   comparing to said measured spectral data said at least one reference spectrum, and additional reference spectra, having said features, that may be provided, to achieve a substantial fit of one of said at least one and additional reference spectra to said measured spectral data; and
   using the result of said comparing step to evaluate said parameters of said at least one layer of each of said first and second regions.

2. The method of claim 1 wherein said at least one and additional reference spectra are provided by a simulated spectral model constituted of at least first and second submodel spectra, one of said submodel spectra being indicative of said values for said parameters of said at least one layer of each of said first and second regions, said first and second submodel spectra corresponding to the spectral contributions from said areas of said first and second regions, respectively, to said measured spectral data; and wherein the parameters of said spectral model are iteratively adjusted, and said comparison is made iteratively, so as to achieve said fit.

3. The method of claim 1 wherein said at least one and additional reference spectra comprise a library of spectra indicative of said parameters of said at least one layer.

4. The method of claim 1 wherein said at least one and additional reference spectra comprise the spectra of reference samples.

5. The method of claim 1 wherein said emanating radiation is selected from the class consisting of reflected radiation, transmitted radiation, emitted radiation, and combinations thereof.

6. The method of claim 5 wherein said emanating radiation is reflected radiation.

7. The method of claim 1 wherein said spot is irradiated with radiation in the infrared spectral region.

8. The method of claim 7 wherein said spot is substantially circular and has a diameter of about 1 to 10 mm.

9. The method of claim 1 wherein said first and second regions are contiguous.

10. The method of claim 1 wherein said first region of said sample includes physical structure that is small in comparison to the wavelength of the radiation employed in said irradiation step, wherein a feature of said at least one and additional reference spectra constitutes, as an effective dielectric function, an averaged value which includes a component that is representative of said physical structure, and wherein the dielectric function of said first region is evaluated in said method.

11. In a method for the production and management of an article, the steps comprising:
   providing a sample having a surface;
   subjecting at least part of said surface to treatment for effecting modification thereof so as to thereby produce an article comprised of at least first and second regions, each of said regions in turn being comprised of at least one layer having parameters that distinguish said regions from one another and that are attributable to at least one of: (1) the dielectric function, and (2) the thickness of said at least one layer thereof;
   irradiating a spot on a surface of said article that constitutes only a portion of said surface and that includes areas of both of said first and second regions;
   measuring radiation emanating from said irradiated spot to obtain measured spectral data;
   providing at least one reference spectrum having features that are indicative of values for said parameters of said at least one layer of said each of said first and second regions, and of the magnitudes of the spectral contributions from said each of said areas to said measured spectral data;
   comparing to said measured spectral data said at least one reference spectrum, and additional reference spectra, having said features, that may be provided, to achieve a substantial fit of one of said at least one and additional reference spectra to said measured spectral data;
   using the result of said comparing step to evaluate at least one of said parameters of said at least one layer of each of said first and second regions; and
   using the aforesaid evaluation for subsequent management of said article produced.

12. The method of claim 11 wherein said modification effected by said treatment comprises depositing a film of material upon at least one of said regions.

13. The method of claim 12 wherein said deposited film comprises the top layer of said article.

14. The method of claim 13 wherein said features of said at least one and additional reference spectra are indicative of values for said parameters of only said top layer.

15. The method of claim 11 wherein said modification effected by said treatment comprises removing a material from at least one of said regions.

16. The method of claim 11 wherein said subsequent management constitutes either the acceptance or the rejection of said article produced.

17. The method of claim 11 wherein said subsequent management of said article produced comprises the control of said treatment of said one of said regions.

18. The method of claim 11 wherein said at least one reference spectrum comprises the spectrum of a reference article, and wherein said reference article is produced by providing a different said sample and carrying out said steps of said method, subsequent to said providing step, thereon.

19. The method of claim 18 wherein a series of said samples are provided, wherein the steps of said method subsequent to said providing step are carried out on each of said samples of said series successively, to produce a series of said articles, and wherein at least one member of said series of said articles provides said reference article.

20. The method of claim 19 wherein other members of said series of said articles provide said additional reference spectra, said one member and other members of said series providing a band of reference spectra within which said measured spectral data falls to achieve said substantial fit in said iterative comparing step.

21. The method of claim 19 wherein said series of articles are produced in a single, substantially continuous operation.

22. The method of claim 18 wherein said measured spectral data are subtracted from the spectrum of said reference article to provide a difference spectrum, and wherein said reference spectrum is a model for said difference spectrum, said difference spectrum, and said at least one spectrum and additional reference spectra provided, being compared to one another in said comparing step.

23. The method of claim 18 wherein said measured spectral data are divided into the spectrum of said reference article to provide a ratio spectrum, and wherein said reference spectrum is a model for said ratio spectrum., said ratio spectrum, and said at least one reference spectrum and additional reference spectra provided, being compared to one another in said comparing step.

24. In a method for the production and management of an article, the steps comprising:

provided a patterned sample comprised of at least first and second regions, each of said regions in turn being comprised of at least one layer having parameters that distinguish said regions from one another and that are attributable to at least one of: (1) the dielectric function, and (2) the thickness of said at least one layer thereof;

irradiating a spot on a surface of said sample that constitutes only a portion of said surface and that includes areas of both of said first and second regions;

measuring radiation emanating from said irradiated spot to obtain a first set of measured spectral data;

subjecting at least part of said surface of said sample that includes both of said first and second regions to treatment for effecting modification thereof, so as to produce an article;

irradiating, on a surface of said article that is in substantial alignment with said surface of said sample, a spot which constitutes only a portion of said surface of said article and that includes said areas of both of said first and second regions of said sample, as so modified;

measuring radiation emanating from said irradiated spot on said article surface to obtain a second set of measured spectral data;

relating said first and second sets of measured spectral data to one another, in either a differential or a ratio relationship to one another, and producing a relational spectrum that is indicative of said sets of measured spectral data, as so related;

providing at least one reference spectrum having features that are indicative of values for said parameters of said at least one layer of said each of said first and second regions, both before and also after such modification and in said relationship to one another, and of the magnitudes of the spectral contributions from said each of said areas to said first set of measured spectral data;

comparing to said relational spectrum said at least one reference spectrum, and additional reference spectra, having said features, that may be provided, to achieve a substantial fit of said at least one and additional reference spectra to said relational spectrum; and using the result of said comparing step to evaluate at least one of said parameters of at least one layer of each of said first and second regions, as so modified.

25. The method of claim 24 wherein said at least one and additional reference spectra are provided by a simulated spectral model constituted of at least first and second submodel spectra, one of said submodel spectra being indicative of said values for said parameters of said at least one layer of each of said first and second regions, said first and second submodel spectra corresponding to the spectral contributions from said areas of said first and second regions, respectively, to said measured spectral data; and wherein the parameters of said spectral model are iteratively adjusted, and said comparison is made iteratively, so as to achieve said fit.

26. The method of claim 24 wherein said at least one and additional reference spectra comprise a library of spectra indicative of said parameters of said at least one layer.

27. The method of claim 24 wherein said at least one and additional reference spectra comprise the spectra of reference samples.

28. The method of claim 24 including the further step of using the evaluation based upon the results of said comparing step for subsequent management of said article.

29. The method of claim 24 wherein said irradiating steps are effected using infrared radiation; wherein said emanating radiation is reflectance; wherein pseudo dielectric functions are defined by said comparing step; wherein said treatment comprises depositing a film of material upon said at least part of said surface; wherein said at least one and additional reference spectra are provided by a simulated spectral model constituted of at least first and second submodel spectra, one of said submodel spectra including parameters that are indicative of the dielectric function and thickness of said at least one layer of each of said first and second regions, as so modified, said first and second submodel spectra corresponding to the spectral contributions from said first and second areas, respectively, to said relational spectrum; and wherein the values of said parameters are iteratively adjusted during said comparing step so as to determine values for the dielectric functions and thickness of said film in said first and second regions, as well as for the relative size of said areas.

30. The method of claim 29 wherein said pseudo dielectric functions are determined from test samples.

31. Apparatus for the fabrication of an article, comprising, in integrated combination:

treating means for treating at least part of a substrate to effect surface modification thereof;

evaluating means for evaluating at least one of the thickness and the composition of layers of which an article is comprised; and control means operatively connected to said evaluating means and said treating means for controlling the operation of said treating means based upon a signal received from said evaluating means, said evaluating means comprising:

means for irradiating a spot on a surface of an article contained in said apparatus;

means for measuring radiation emanating from said irradiated spot to obtain measured spectral data;

means for providing at least one reference spectrum having features that are indicative of values for parameters that are attributable to at least one of: (1) the dielectric function, and (2) the thickness of at least one layer of each of first and second regions irradiated by said spot, and of the magnitudes of the spectral contributions from irradiated areas of each of said regions to said measured spectral data;

means for comparing to said measured spectral data said at least one reference spectrum, and additional reference spectra, having said features, that may be provided, to achieve a substantial fit of one of said at least one and additional reference spectra to said measured spectral data; and means for using the result of said comparing step to evaluate said parameters of said at least one layer of each of said first and second regions, and for generating a signal indicative thereof.

32. The apparatus of claim 31 wherein said evaluating means comprises a Fourier transform infrared spectrometer.

33. The apparatus of claim 31 additionally including means for transporting an article between said treating means and said evaluating means.

* * * * *